United States Patent
Morton et al.

(10) Patent No.: US 8,100,587 B2
(45) Date of Patent: Jan. 24, 2012

(54) BEARING ARRANGEMENT

(75) Inventors: Graham P. Morton, Nottingham (GB); Stephen T. McDonagh, Derby (GB)

(73) Assignee: Rolls-Royce PLC, London (GB)

( * ) Notice: Subject to any disclaimer, the term of this patent is extended or adjusted under 35 U.S.C. 154(b) by 559 days.

(21) Appl. No.: 12/318,017

(22) Filed: Dec. 19, 2008

(65) Prior Publication Data

US 2009/0185769 A1   Jul. 23, 2009

(30) Foreign Application Priority Data

Jan. 17, 2008   (GB) .................................... 0800796.5

(51) Int. Cl.
*F16C 33/58*   (2006.01)
(52) U.S. Cl. ........................................ 384/569; 384/581
(58) Field of Classification Search .................. 384/447, 384/513, 535, 569, 581
See application file for complete search history.

(56) References Cited

U.S. PATENT DOCUMENTS

| | | | | |
|---|---|---|---|---|
| 2,877,068 A | * | 3/1959 | Schaefer | 384/537 |
| 3,009,748 A | * | 11/1961 | Pitner | 384/581 |
| 5,020,925 A | * | 6/1991 | Stephan et al. | 384/569 |
| 5,567,060 A | * | 10/1996 | Steinberger et al. | 384/569 |
| 6,062,736 A | * | 5/2000 | Zernickel | 384/581 |
| 6,109,791 A | * | 8/2000 | Metton et al. | 384/99 |
| 6,334,714 B1 | * | 1/2002 | Harimoto et al. | 384/569 |
| 2002/0064418 A1 | | 5/2002 | Wiesneth et al. | |

FOREIGN PATENT DOCUMENTS

| | | |
|---|---|---|
| DE | 1 158 325 | 11/1963 |
| GB | 1 235 791 A | 6/1971 |

* cited by examiner

*Primary Examiner* — Thomas R Hannon

(74) *Attorney, Agent, or Firm* — Oliff & Berridge, PLC

(57) ABSTRACT

An outer ring for a rolling element bearing has three mounting pads on its outer surface. The inner surface of the ring is arranged to be non-circular, with its effective radius being at a minimum at the three points midway between adjacent pairs of mounting pads. This provides a preload on the rolling elements of the bearing in use, preventing skidding, but because the ring is not supported between the pads it can still flex under loads. The ring may be oriented in use so that transient loads are directed through one of the mounting pads.

11 Claims, 3 Drawing Sheets

BEARING ARRANGEMENT

This invention relates to rolling element bearings, and more particularly to the design of outer rings for such bearings.

A known problem with rolling element bearings (especially those that operate at high speeds but at low loads) is skidding. The rolling element, instead of rolling on the raceway of the bearing, slides along it. This causes the rolling element to heat up at the contact point. If the element breaks through the lubricant film, damage may be caused to the rolling elements or to the raceways. This phenomenon is known as skidding.

A known way to reduce skidding in lightly loaded bearings is deliberately to make one of the raceways non-circular (out of round) so that an interference exists across the bearing at two or more points. In use, the out-of-round ring will then deflect due to this interference until a force equilibrium is reached, and a resultant load will be present at two or more positions across the bearing. The magnitude of the force can be controlled (by suitable choice of the magnitude of the non-circularity) to prevent the bearing from skidding.

A disadvantage with such bearings is that they require a squeeze film housing, or some other type of housing with enough clearance to allow the outer ring to deflect. However, because such housings allow a certain degree of movement of the outer ring, they cannot provide accurate positioning and centering of the bearing, together with adequate stiffness, in use. For some applications, for example in supporting bevel gears, the positional accuracy and the stiffness of the support is critical for reliable operation, and so squeeze film housings are undesirable.

This invention presents an improved solution to the problem of skidding in lightly-loaded bearings, which does not compromise the positional accuracy provided by the bearing under load, and is therefore suitable, for example, for bearings supporting bevel gears.

It is anticipated that the invention would be particularly beneficial for supporting bevel gears in a gas turbine engine. It would also be suitable for use in any other transmission arrangement in which high unidirectional transient loads are experienced.

According to the invention, there is provided a bearing arrangement as set out in the claims.

The invention will now be described, by way of example only, with reference to the accompanying drawings in which FIG. 1 is a schematic axial view of an outer ring of a bearing arrangement according to the invention;

Figure 1:
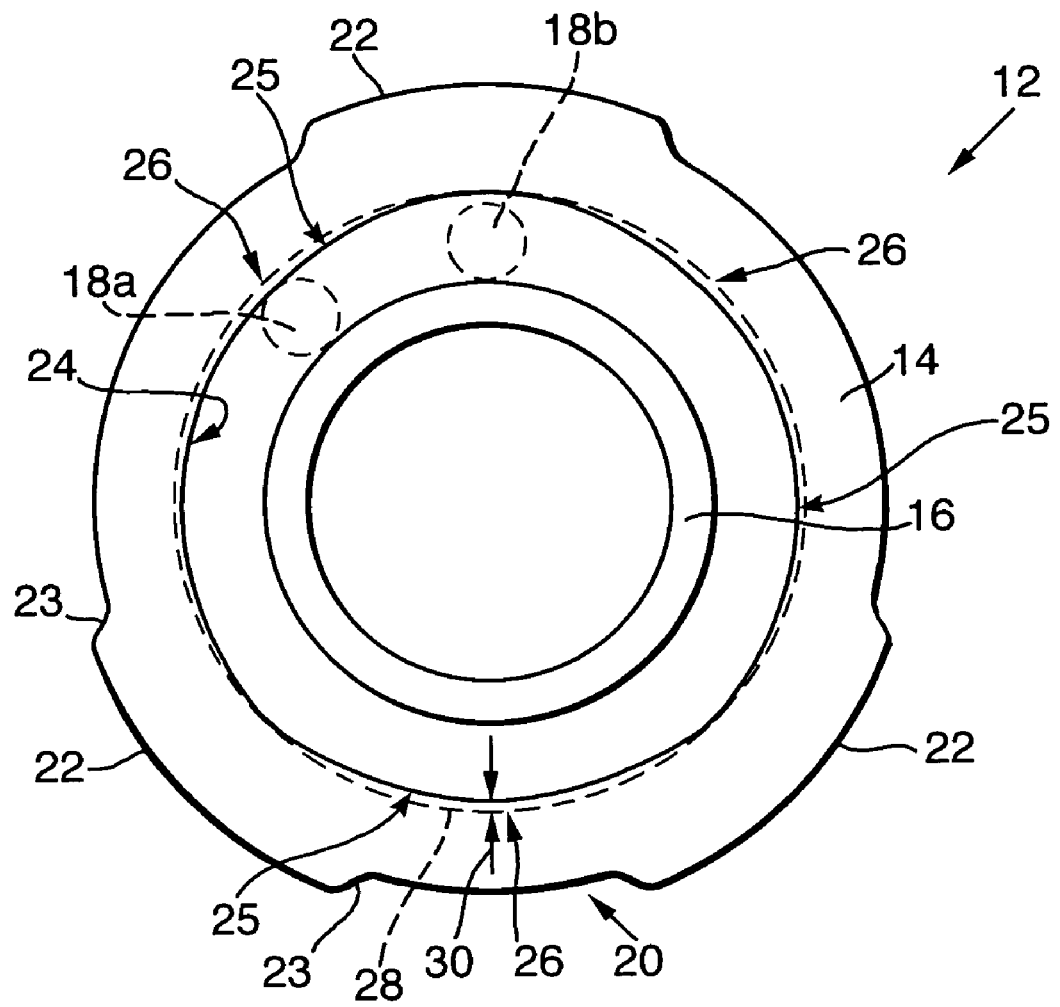

Referring first to FIG. 1, a rolling element bearing is shown generally at 12. The bearing comprises an outer ring 14, an inner ring 16 and a plurality of rolling elements (of which only two, 18a and 18b, are shown by dashed lines).

The outer ring 14 has a radially outer surface 20 and a radially inner surface 24.

The radially outer surface 20 is generally circular, with three first regions defined by radially outwardly extending mounting pads 22. In use, these mounting pads 22 locate by an interference fit into the structure (not shown) surrounding the bearing 12, thus providing accurate location and centering of the outer ring 14. Blend radii 23 provide a smoother transition between each mounting pad 22 and the outer surface 20. The circumferential extent of each mounting pad 22 is about 25 degrees. In use, the parts of the outer surface 20 between the mounting pads 22 do not contact the structure. These parts of the outer surface 20 between the mounting pads 22 define second regions.

Because the second regions of the outer ring 14 between the mounting pads 22 have a lesser thickness than the first regions where the mounting pads 22 are located, it will be appreciated that the stiffness, in the radial direction, of these second regions is inherently less than the radial stiffness of the first regions. In use, when the outer ring 14 is located into the structure surrounding the bearing 12, as outlined above, the radial stiffness of the first regions will be further enhanced by their interference fit with the structure. Because the second regions do not contact the structure in use, their radial stiffness will not be significantly altered between the "free" and "in use" conditions of the outer ring 14.

The radially inner surface 24 is not circular, but has a three-lobed shape. The effective radius of the inner surface 24 has a sinusoidal profile such that the effective radius is reduced over the extent of each of the three lobes 25. The central points 26 of the lobes 25 are the positions of the maximum reduction 30 in effective radius. These central points 26 are midway between the central points of adjacent mounting pads 22. The dashed line 28 is circular, and shows diagrammatically the deviation of the inner surface 24 from a true circle. The magnitude of the out-of-roundness changes between the free (as manufactured) and fitted states, but is typically 0.025 mm to 0.400 mm based on the effective radius of the surface. The central points 26 of the three lobes are midway between the central points of adjacent mounting pads 22, and therefore at the centre of each second region.

In use, a set of rolling elements run between the outer 14 and inner 16 rings of the bearing 12. The number of rolling elements in a set will vary between applications, but in general they will substantially fill the circumferential space between the rings 14 and 16. In FIG. 1, just two rolling elements 18a and 18b of the set are shown.

The rolling element shown at 18b just makes a clearance fit between the outer 14 and inner 16 rings. It will therefore be appreciated that the rolling element shown at 18a must make an interference fit between the outer 14 and inner 16 rings, because the effective radius of the inner surface is smaller at the position 26. The outer ring 14 will deflect due to this interference until a force equilibrium is reached, and a resultant load will be present, in the radial direction, across the rolling element 18a.

The same would be true for a rolling element positioned in the equivalent position adjacent to the central point 26 of one of the other two lobes 25. There would also be a lesser interference, and thus a lesser force, for a rolling element at any intermediate position between 18a and 18b, until at 18b clearance conditions are established.

It will be appreciated that in use, as a given rolling element rotates around the raceway, the load on it arising from the non-circularity of the raceway will continuously vary.

It will also be appreciated that in a complete bearing 12 with a full set of rolling elements, at any moment a number of rolling elements will make an interference fit between the rings, and so there will be a continuous drive to a number of the rolling elements.

Figure 2:
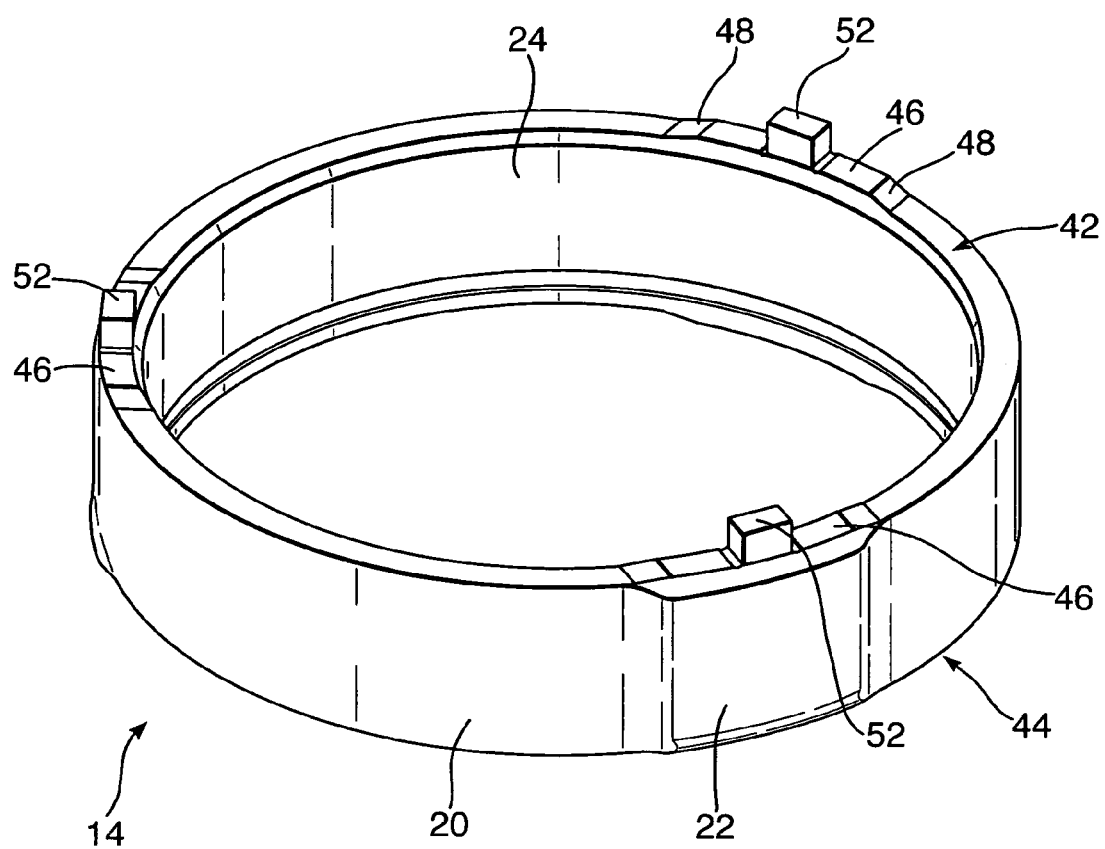
FIG. 2 is a schematic perspective view of an outer ring of a bearing arrangement according to the invention.

FIG. 2 shows a perspective view of the outer ring 14 of the bearing 12 of FIG. 1, and corresponding parts are indicated by the same numbers as in FIG. 1.

The outer ring 14 has two axial faces 42 and 44. On each of these surfaces 42 and 44 there are three axially extending mounting pads 46. In FIG. 2, only the pads on the surface 42 are visible, but the following description applies equally to the pads on the surface 44.

Blend radii 48 provide a smoother transition between each mounting pad 46 and the end face 42. The circumferential extent of each mounting pad 46 is about 25 degrees. In use, the axially extending mounting pads 46 contact the structure surrounding the outer ring 14, to provide positive axial location of the outer ring 14. Typically, the outer ring 14 will be mechanically secured to the structure in the axial direction, for example by clamping.

It will be appreciated that, because the axially extending mounting pads 46 are coincident with the radially extending mounting pads 22, the outer ring 14 is in contact with the associated structure only at these regions of the circumference. The regions between the mounting pads 22 and between the mounting pads 46 are not in contact with the structure and are consequently free to move. In effect, the stiffness of the outer ring 14, both in the radial and in the axial direction, is greater at the positions of the mounting pads 22 and 46, and less at the positions between the mounting pads. Because of this, the regions of the outer ring 14 near to the points 26 may flex to react the force transmitted through the rolling element 18a. However, because the outer ring 14 is securely located in the surrounding structure by the mounting pads 22 and 46, the centering and positioning of the bearing is not compromised by this flexing. The invention maintains the required positional accuracy of the bearing in the first regions, at the locations of the mounting pads 22 and 46, while allowing sufficient flexibility in the second regions between the pads to allow the use of a non-circular ring to avoid skidding.

The outer ring 14 also has three locating features 52, which extend in an axial direction from the axial surface 42. In use, these features 52 locate in corresponding recesses in the surrounding structure so that the outer ring 14, when installed, is in a known angular position. These features 52 may also act as anti-rotation features, if necessary.

During operation, high magnitude uni-radial but transient loads may be generated. (By uni-radial is meant that the loads act in a single radial direction.) Where the bearing supports bevel gears in a gas turbine engine, for example, such loads are generated during engine starting. These loads are reacted through the bearings. In this invention, the known angular position of the outer ring 14 is chosen so that the transient forces (or at least the most significant of them) act through one of the mounting pads 22. Therefore, the forces are transmitted through the stiffest part of the outer ring 14 at one of the first regions, and into the surrounding structure, consequently allowing the high transient loads to be controlled and dissipated through a selected route into the structure with minimum deflection of the bearing ring.

Figure 3:
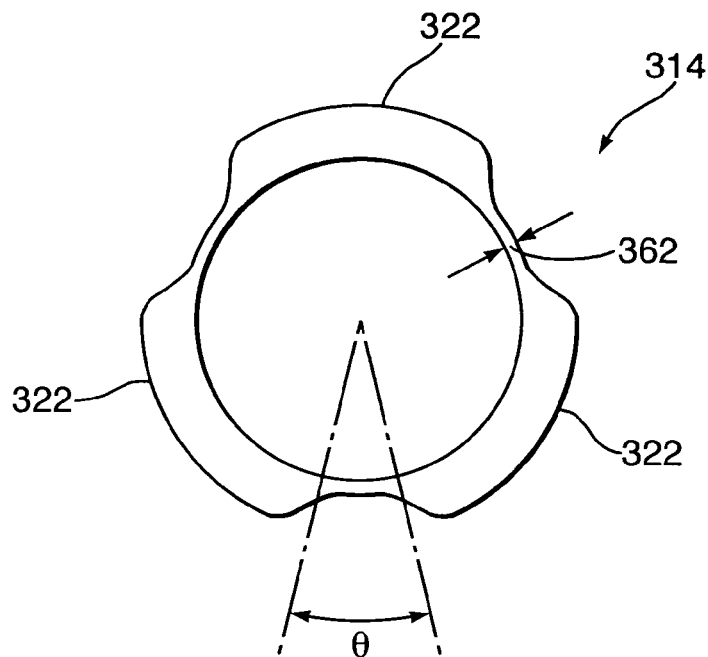
FIG. 3 is a schematic axial view of an alternative embodiment of an outer ring of a bearing arrangement according to the invention.

FIG. 3 shows, schematically, an alternative embodiment of an outer ring for a rolling element bearing according to the invention. The arrangement is generally as shown in FIG. 1, but in this embodiment the second regions of the outer ring 314 between the mounting pads 322 are thinner, in the radial direction, than in the embodiment of FIG. 1, and the angular extent of each of the mounting pads 322, defining the first regions, is greater than in FIG. 1. The same effect is therefore achieved, with the reduced thickness 362 of the thinned regions serving to reduce their radial stiffness, and thereby compensate for the reduced angular extent θ of these regions compared with the embodiment of FIG. 1.

Figure 4:
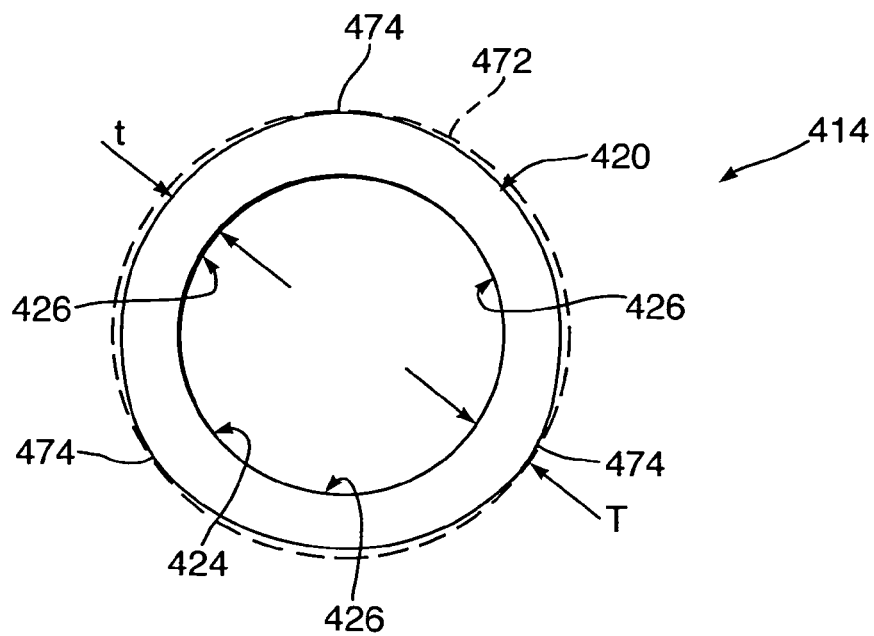
FIG. 4 is a schematic axial view of a further alternative embodiment of an outer ring of a bearing arrangement according to the invention.

FIG. 4 shows, schematically, a further alternative embodiment of an outer ring for a rolling element bearing according to the invention. The outer surface 420 of the outer ring 414 does not have discrete mounting pads as in the previous embodiments, but instead has a three-lobed profile. The dashed circle 472 shows the deviation of the outer surface 420 from a true circle. In use, the outer ring 414 would locate by interference fit, in the structure surrounding the bearing, at the three points 474 where the effective radius of the outer ring 414 is greatest. These points 474 therefore define first regions of the outer ring 414. As in the previous embodiments, the central points 426 of the three lobes of the radially inner surface 424 at which the effective radius of the inner surface 424 is at a minimum) are circumferentially midway between the points 474 and define second regions as before. It will be seen that in this embodiment the radial thickness t of the outer ring 414 at each of the points 426 is less than the radial thickness T of the outer ring 414 at each of the points 474. Therefore, the same effect is achieved as in the other embodiments described, that the radial stiffness of the outer ring 414 is less at the points 426 than at the points 474. As explained above, and as with the other embodiments, this difference in radial stiffness is amplified when, in use, the outer ring 414 is located by interference fit in the structure surrounding the bearing.

Alternatively, it would be possible to arrange the embodiment of FIG. 4 so that the radial thickness t or T of the outer ring 414 would be uniform around the whole circumference. In this case, the difference in radial stiffness at different points around the circumference would arise solely from the fact that, in use, the outer ring 414 is located, by the interference fit of the first regions 474, in the structure surrounding the bearing, while the second regions 426 are not in contact with the surrounding structure.

The invention therefore provides an improved solution to the problem of skidding in lightly loaded bearings, which does not compromise the positional accuracy of the bearing or its ability to transmit high transient loads.

The skilled person will appreciate that various alternatives and modifications may be employed without deviating from the principle of the invention.

For example, the radially inner surface 24 of the outer ring may have fewer or more lobes than the three described.

The circumferential extent of the mounting pads 22, 46 may be different from the values employed in the described embodiments. A smaller circumferential extent will tend to reduce the stiffness of the regions between the mounting pads, and a larger circumferential extent will tend to increase it. It is envisaged, for example, that in the embodiment shown in FIG. 1 the circumferential extent of each mounting pad would be between 10 degrees and 30 degrees.

In the embodiment of FIGS. 1 and 2, there are three locating features 52, each one located on one of the axially extending mounting pads 46. In other embodiments, a different number of locating features 52 may be used, and they may be located in any suitable positions on the outer ring 14.

In the embodiment shown in FIG. 4, the outer surface 420 of the outer ring 414 may have fewer or more lobes than the three described.

In the various embodiments of the invention that have been described, the first and second regions are defined by non-circular features of the outer ring 14, 314, 414—in the embodiments of FIGS. 1-3 by providing mounting pads, and in the embodiment of FIG. 4 by providing a three-lobed profile of the outer surface. It will be appreciated that the first and second regions could equally well be defined by providing equivalent non-circular features on the radially inner surface of the structure surrounding the outer ring, in conjunction with an outer ring having a circular outer surface.

The locating features 52 shown in FIG. 2 could be used in conjunction with the embodiments shown in FIGS. 3 and 4.

The rolling elements may be mounted in a cage.

Although the invention has been described principally in the context of a gas turbine engine, it will be appreciated that it could equally well be applied in any transmission arrangement in which high, unidirectional transient loads are experienced.

The invention claimed is:

1. A bearing arrangement comprising:
   an outer ring for a rolling element bearing, the outer ring having a radially outer surface, wherein the outer ring further comprises an axial surface, in which a plurality of axially extending mounting pads is provided on the axial surface, and
   a structure to which the outer ring locates in use, the structure having a radially inner surface, wherein
   the ring outer surface and the structure inner surface confront each other in use so as to define a plurality of first regions at which the ring outer surface and the structure inner surface are in contact, and a plurality of second regions interposed between the first regions, at which there is a clearance between the ring outer surface and the structure inner surface, so that the radial stiffness of the outer ring is lower in each of the second regions than in each of the first regions.

2. The bearing arrangement as claimed in claim 1, in which the outer ring further comprises a radially inner surface, and an effective radius of the ring inner surface, wherein the effective radius is reduced at a plurality of positions corresponding to the positions of the plurality of second regions.

3. The bearing arrangement as claimed in claim 2, in which the maximum reduction in the effective radius at each position is between 0.025 mm and 0.400 mm.

4. The bearing arrangement as claimed in claim 1, in which there are three first regions and three second regions.

5. The bearing arrangement as claimed in claim 1, in which the effective radius of the ring outer surface varies smoothly around its circumference, and the effective radius is at a maximum at the centre of each first region and is at a minimum at the centre of each second region.

6. The bearing arrangement as claimed in claim 1, in which the ring is aligned in use so that transient forces arising in use will be directed through one of the first regions.

7. The bearing arrangement as claimed in claim 6, in which a locating feature is provided on a surface of the outer ring to ensure a predetermined circumferential alignment in use.

8. The bearing arrangement as claimed in claim 7, in which the locating feature is on the axial surface of the outer ring.

9. The bearing arrangement as claimed in claim 1, in which a plurality of radially outwardly extending mounting pads is provided on the ring outer surface, and each mounting pad defines one of the first regions.

10. The bearing arrangement as claimed in claim 9, in which the circumferential extent of each mounting pad is between 10 degrees and 30 degrees.

11. The bearing arrangement as claimed in claim 9, in which the axially extending mounting pads are circumferentially aligned with the radially outwardly extending mounting pads.

* * * * *